July 26, 1927.
E. M. HEWLETT ET AL
1,637,039
SYSTEM FOR THE TRANSMISSION OF ANGULAR MOTION
Filed Dec. 5, 1924
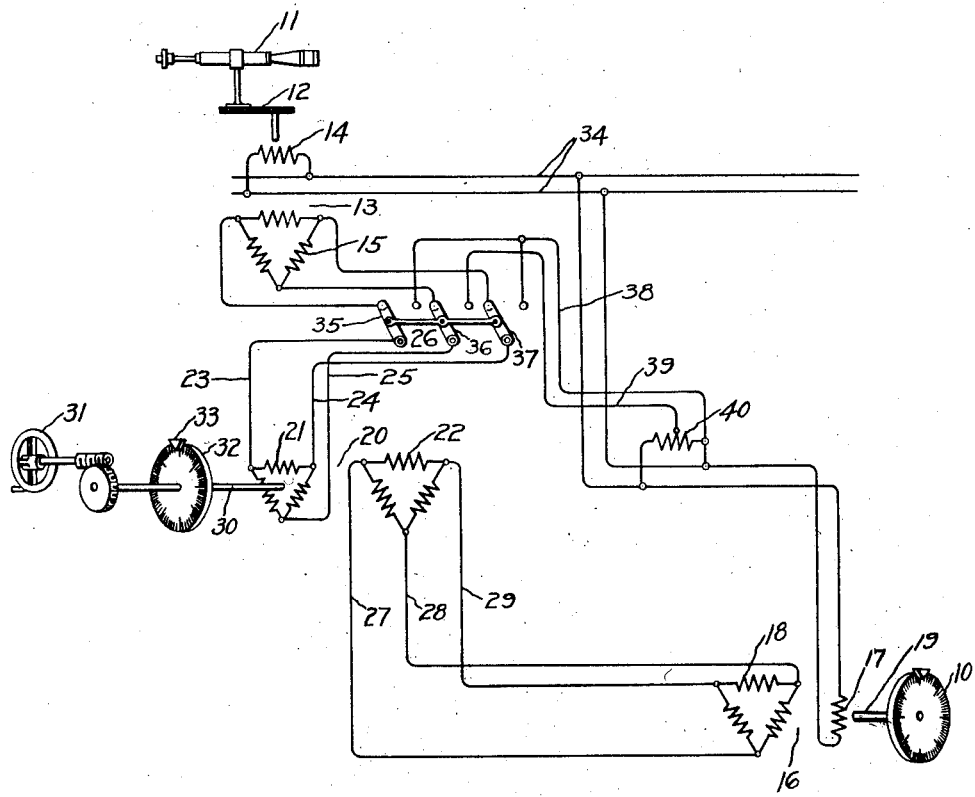
Inventors:
Edward M. Hewlett,
Waldo W. Willard,
by
Their Attorney.

Patented July 26, 1927.

1,637,039

UNITED STATES PATENT OFFICE.

EDWARD M. HEWLETT AND WALDO W. WILLARD, OF SCHENECTADY, NEW YORK, ASSIGNORS TO GENERAL ELECTRIC COMPANY, A CORPORATION OF NEW YORK.

SYSTEM FOR THE TRANSMISSION OF ANGULAR MOTION.

Application filed December 5, 1924. Serial No. 754,226.

Our invention relates to systems for the transmission of angular motion and has for its object the provision of means whereby when the transmitting device is inoperative or for any reason cannot be used, other devices in the system may be used as a transmitting device.

More specifically our invention relates to systems for the transmission of angular motion in which transmitting and receiving devices of the alternating current type are used and also an inductive device for introducing corrections.

In carrying out our invention, we provide means whereby the inductive device for introducing corrections may be utilized in emergencies as a transmitting device.

For a more complete understanding of our invention reference should be had to the accompanying drawing, the single figure of which shows in diagrammatic fashion a system for the transmission of angular motion embodying our invention.

Referring to the drawing, we have shown our invention in one form as applied to the driving of a remotely situated indicating device, shown as a dial 10, in response to the angular movements of a telescope 11, or other object, in a predetermined plane, such as a horizontal plane. Connected to the telescope through suitable gearing 12 is a motion transmitting device 13. This transmitting device is provided with a bi-polar field winding 14 preferably mounted on the rotor, and a polycircuit armature winding 15 on its stator shown as physically similar to a three-phase delta connected armature winding. The dial 10 is driven by a receiving device 16, similar in construction to the transmitting device 13, having a single circuit field winding 17 and a polycircuit armature winding 18. The dial may be secured to the rotor shaft 19 of the receiving device.

Like points of the two armature windings 15 and 18 are electrically connected together and, as shown, a differential device 20 for introducing corrections may be interposed in these connections, such as described and claimed in our Patent No. 1,612,117, dated December 23, 1926. This differential device comprises two inductively associated three-circuit windings 21 and 22, winding 21 being connected to the armature winding 15 through conductors 23, 24 and 25 and a switch 26, while winding 22 is connected to winding 18 through conductors 27, 28 and 29. One of the windings of the differential device is rotatably mounted. As shown, the winding 21 may be rotated by means of a shaft 30 on which it is mounted, the shaft being turned by a suitable handwheel 31. A dial 32 is provided on the shaft 30 and cooperating with the dial is a stationary pointer 33, whereby corrections can be accurately introduced. The field windings 14 and 17 are connected to a suitable source of alternating current supply 34.

In the operation of transmitting and receiving devices of this character, the field windings induce electromotive forces in the circuits of the armature windings, the relative values and directions of these electromotive forces varying in accordance with the relative angular position of the respective field winding. When the two rotors are in corresponding angular positions, the electromotive forces induced in the armature windings are respectively equal and opposite to each other, and since like points of the two windings are connected, the electromotive forces are also in opposition to each other and consequently no currents are set up. Upon rotation of the field winding of the transmitter, however, a new set of electromotive forces is induced in the armature circuits of the transmitter, and as a result the electromotive forces of the two devices become unbalanced and currents are set up. This results in a torque being applied to the rotor of the receiver whereby it is turned to a position in which the electromotive forces again balance, this position corresponding to the position of the transmitter.

When the two windings of the differential device 20 are in corresponding angular positions, as shown, the differential device has no effect on the set of electromotive forces transmitted to it from the transmitter. By turning winding 21 by means of handwheel 31 the differential device is caused to transmit a different set of electromotive forces; i. e., the set of electromotive forces induced in the winding 22 and applied to the receiving device will be different from the set impressed on winding 21 by the transmitting device. This change in the set of the electromotive forces is proportional to the amount of angular displacement of winding 21 and any desired changes or corrections may thereby be introduced in the angular position of the dial 10 independently of the transmitting device.

In certain cases upon damage to or failure of the transmitting device, it is very essential to have immediately available auxiliary transmitting means which can be used temporarily to at least approximate the operation of the transmitting device. We have provided means whereby the differential device may be changed over as desired and operated as a transmitter.

It will be observed that if the winding 21 of the differential device were energized to produce an alternating current field similar to the field produced by winding 14, the differential device would in fact be a transmitter. We accordingly provide connections whereby the winding 21 can be connected to the supply source 34 in such manner as to produce this field.

The switch 26, interposed in the connections between winding 21 and winding 15, is suitably arranged in such manner that the winding 21 may be connected to the supply source 34. For example, the switch may consist of three pivoted arms 35, 36 and 37, insulated from each other, each of which moves between a pair of stationary contacts. By throwing the arms to the left, as shown in the drawing, the winding 21 is connected to the winding 15 while by throwing the arms to the right into engagement with the other stationary contacts the winding 21 is connected to the supply source 34. One side of the supply source is connected through a conductor 38 to the stationary contacts engaged by two of the switch arms, such as arms 35 and 37. The remaining contact engaged by arm 36 is connected through a conductor 39 to a suitable intermediate point of an auto-transformer provided with a winding 40. This winding 40 is connected directly across the supply source 34 and the conductor 39 is connected to it at such a point as to give a suitably reduced voltage for the winding 21. This reduced voltage is often required by reason of the fact that as ordinarily constructed the electromotive forces induced in the circuits of the armature winding of the transmitting and receiving devices and applied to the winding of the differential device may be considerably lower than the voltages applied to the field windings from the supply source 34. The differential device therefore may not be adapted for the full voltage of the supply source 34.

As thus connected, it will be observed that with the switch 26 thrown to the right, two of the terminals of winding 21 are connected together to one side of the supply source while the other terminal is connected to a tap on the winding 40. The winding 21 is thus caused to produce a bi-polar field corresponding to the field produced by winding 14. The differential device can, therefore, be used in the same manner as the transmitter 13. By turning the winding 21 by means of the handwheel 31 the movements and position of the dial 10 can be controlled as desired.

While we have described our invention as embodied in concrete form and as operating in a specific manner in accordance with the patent statutes, it should be understood that we do not limit our invention thereto, since various modifications thereof will suggest themselves to those skilled in the art without departing from the spirit of our invention, the scope of which is set forth in the annexed claims.

What we claim as new and desire to secure by Letters Patent of the United States, is,—

1. A system for the transmission of angular motion comprising an inductive transmitting device, an inductive receiving device, a source of alternating current supply connected to said devices, connections between said devices including inductive means for introducing corrections, said inductive means being provided with relatively adjustable windings, and means for disconnecting said transmitting device and for connecting said inductive means to said supply source.

2. A system for the transmission of angular motion comprising a transmitting device provided with a single circuit field winding and a polycircuit armature winding, a receiving device similar to said transmitting device, a source of alternating current supply connected to the field windings of said devices, electrical connections between the armature windings of said devices including inductive means for introducing corrections, said inductive means comprising relatively rotatable windings, and means for disconnecting said transmitting device and for connecting said inductive means to said supply source.

3. A system for the transmission of angular motion comprising a transmitting device provided with a single circuit field winding and a polycircuit armature winding, one of said windings being rotatably mounted, a receiving device having similar windings, a source of alternating current supply connected to the field windings of said devices, a correction device having relatively rotatable polycircuit windings, connections between the windings of said correction device and the armature windings of said transmitting and receiving devices respectively, and a switch for disconnecting said transmitting device and for connecting said correction device to said supply source.

4. A system for the transmission of angular motion comprising a transmitting device provided with a single circuit field winding and a three-circuit armature winding, one of said windings being rotatably mounted, a receiving device having similar windings, a single phase source of supply connected to the field windings of said devices, a correction device having relatively rotatable three-circuit windings, connections between the windings of said correction device and the armature windings of said transmitting and receiving devices respectively, and a switch for disconnecting said transmitting device and for connecting the corresponding winding of said correction device to said supply source so that two of the terminals of said correction device winding are connected together.

5. A system for the transmission of angulor motion comprising a transmitting device provided with a single circuit field winding and a three-circuit armature winding, one of said windings being rotatably mounted, a receiving device having similar windings, a single phase source of supply connected to the field windings of said devices, a correction device having relatively rotatable three-circuit windings, connections between the windings of said correction device and the armature windings of said transmitting and receiving devices respectively, a switch for disconnecting said transmitting device and for connecting the corresponding winding of said correction device to said supply source so that two of the terminals of said correction device winding are connected together, and means for reducing the voltage impressed on said correction device winding from said supply source.

In witness whereof, we have hereunto set our hands this fourth day of December, 1924.

EDWARD M. HEWLETT.
WALDO W. WILLARD.